US012701345B2

(12) United States Patent
Dal Farra et al.

(10) Patent No.: US 12,701,345 B2
(45) Date of Patent: Aug. 4, 2026

(54) MARGIN ALERT FOR AN OPTICAL NETWORK

(71) Applicant: 1FINITY Inc., Kawasaki (JP)

(72) Inventors: David Dal Farra, Richardson, TX (US); Quang Tieu, Richardson, TX (US); David Terwilliger, Garland, TX (US); Catherine Yuan, Plano, TX (US)

(73) Assignee: 1FINITY Inc., Kawasaki (JP)

( * ) Notice: Subject to any disclaimer, the term of this patent is extended or adjusted under 35 U.S.C. 154(b) by 329 days.

(21) Appl. No.: 18/605,944

(22) Filed: Mar. 15, 2024

(65) Prior Publication Data

US 2025/0294274 A1     Sep. 18, 2025

(51) Int. Cl.
*H04Q 11/00*          (2006.01)

(52) U.S. Cl.
CPC . *H04Q 11/0062* (2013.01); *H04Q 2011/0083* (2013.01); *H04Q 2011/0084* (2013.01); *H04Q 2011/0086* (2013.01)

(58) Field of Classification Search
None
See application file for complete search history.

(56) References Cited

U.S. PATENT DOCUMENTS

| | | | | |
|---|---|---|---|---|
| 9,485,553 | B2 * | 11/2016 | Magri | H04J 14/026 |
| 11,381,306 | B2 * | 7/2022 | Crognale | H04B 10/2507 |
| 12,549,271 | B2 * | 2/2026 | Matsuo | H04J 14/02 |
| 2010/0014855 | A1 * | 1/2010 | Arnone | H04J 14/0227 398/17 |
| 2025/0253941 | A1 * | 8/2025 | Liu | H04B 10/0773 |

* cited by examiner

*Primary Examiner* — Jai M Lee
(74) *Attorney, Agent, or Firm* — Fujitsu Intellectual Property Center

(57) ABSTRACT

A communication method leveraging service margin aware thresholds of optical alerts within an optical communication network line system is provided. The method includes determining an optical margin for a service provided between a source transponder and a destination transponder through an Optical Line System (OLS). The communication method includes monitoring PMs and fixed predetermined thresholds to raise a threshold crossing alert (TCA) indicating a monitored PM has crossed a fixed predetermined threshold. The method also determines a Service Margin Aware OLS TCA Threshold (SMAOTT) that is unique to a service or location within the OLS, monitors PMs and the determined SMOATT at a network element within the OLS, and raises a specific TCA associated with a SMAOTT when a monitored PM satisfies the SMAOTT.

19 Claims, 7 Drawing Sheets

| Service Type | Delivered Q @ Start | Min Delivered Q Allowed | SMAOTT: Maximum Span Loss "170c" Allowed @ Min Q |
|---|---|---|---|
| A1 | 100G QPSK | 22 dB | 14 dB | 18 dB |
| A2 | 200G 16QAM | 21 dB | 17 dB | 12 dB |
| N1 | 200G 16QAM | 27 dB | 17 dB | 19 dB |
| N2 | 400G 16QAM | 27 dB | 22 dB | 12 dB |
| N3 | 800G | 26 dB | 24 dB | 10 dB |

| Service Type | | Delivered Q @ Start | Min Delivered Q Allowed | SMAOTT: Minimum OSNR allowed at monitoring location @Min Delivered Q Allowed |
|---|---|---|---|---|
| A1 | 100G QPSK | 22 dB | 14 dB | 15 dB |
| A2 | 200G 16QAM | 21 dB | 17 dB | 18 dB |
| N1 | 200G 16QAM | 27 dB | 17 dB | 18 dB |
| N2 | 400G 16QAM | 27 dB | 22 dB | 23 dB |
| N3 | 800G | 26 dB | 24 dB | 25 dB |

MARGIN ALERT FOR AN OPTICAL NETWORK

FIELD

The embodiments discussed in the present disclosure are related to a margin alert for an optical network.

BACKGROUND

Optical communications may be configured to travel long distances and/or may experience various signal degradations during the transmission thereof resulting in a limited optical margin which describes the amount of signal degradation that may occur before services carried by the optical signal may experience errors.

In some circumstances, optical networks may performance monitor optical parameters of the optical signals in the optical network. In existing systems, the monitoring of the optical parameters may raise threshold crossing alerts (TCAs) based on predetermined thresholds and are generally applied to any or all optical signals included in the optical network. In existing systems, it is common for performance monitors in the Optical Line System (OLS) to not have visibility of the optical margin available to the optical signals because bit errors are only detected at endpoints of signal transmissions such as e.g., transponder locations. As such, some alerts associated with the existing OLS may occur too early or too late, as the thresholds are broadly applied and may not be indicative of data errors associated with the signal degradations to the optical signals. As such, in existing systems, determining if an OLS optical degradation is a high risk of causing bit errors and/or determining a cause and/or a location of an issue within the optical network after it has occurred is often difficult, time-intensive, and/or costly as locations and/or causes of an issue may not be readily identified with conventional techniques. More specifically, alarms or alerts within existing optical line systems do not and cannot predict Bit Error Risk (BER) for services unless monitoring the delivered service quality directly, or the alert is severe. Severe alerts are e.g., a Loss of Signal (LoS) or Signal Out of Range.

This disclosure describes a new OLS alerting method which adaptively sets OLS TCA thresholds reflecting the actual optical service margin available, per service.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a communication method leveraging service margin aware thresholds of optical alerts within an optical communication network line system is provided.

The method includes determining an optical margin for a service provided between a source transponder and a destination transponder through an Optical Line System (OLS). The OLS includes a plurality of network elements, and plurality of spans connecting the plurality network elements. A network controller, data storage and user interface may be used in connection with the method. The communication method includes monitoring PMs and fixed predetermined thresholds to raise a threshold crossing alert (TCA) indicating a monitored PM has crossed a fixed predetermined threshold.

Embodiments of the method also describe determining, by a network controller or equivalent, a Service Margin Aware OLS TCA Threshold (SMAOTT) that is unique to a service or location within the OLS even if the PM has no ability to differentiate services, monitoring PMs and the determined SMOATT at a network element within the OLS; and raising a specific TCA associated with a SMAOTT when a monitored PM satisfies the SMAOTT. An alert responsive procedure is triggered for the specific TCA when the SMAOTT is satisfied to identify the service or location within the OLS associated with the SMAOTT.

According to embodiments of this disclosure, a controller may determine SMAOTTs unique for each service, and unique to each monitoring point, enabling improved monitoring, network operation, control and trouble-shooting abilities associated with a network.

The object and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 is an example table used to explain a working example with SMAOTTs that are signal independent such as span loss;

FIG. 6 is an example table used to explain a working example with SMAOTTs that are signal dependent such as OSNR per service.

DESCRIPTION OF EMBODIMENTS

Figure 1:
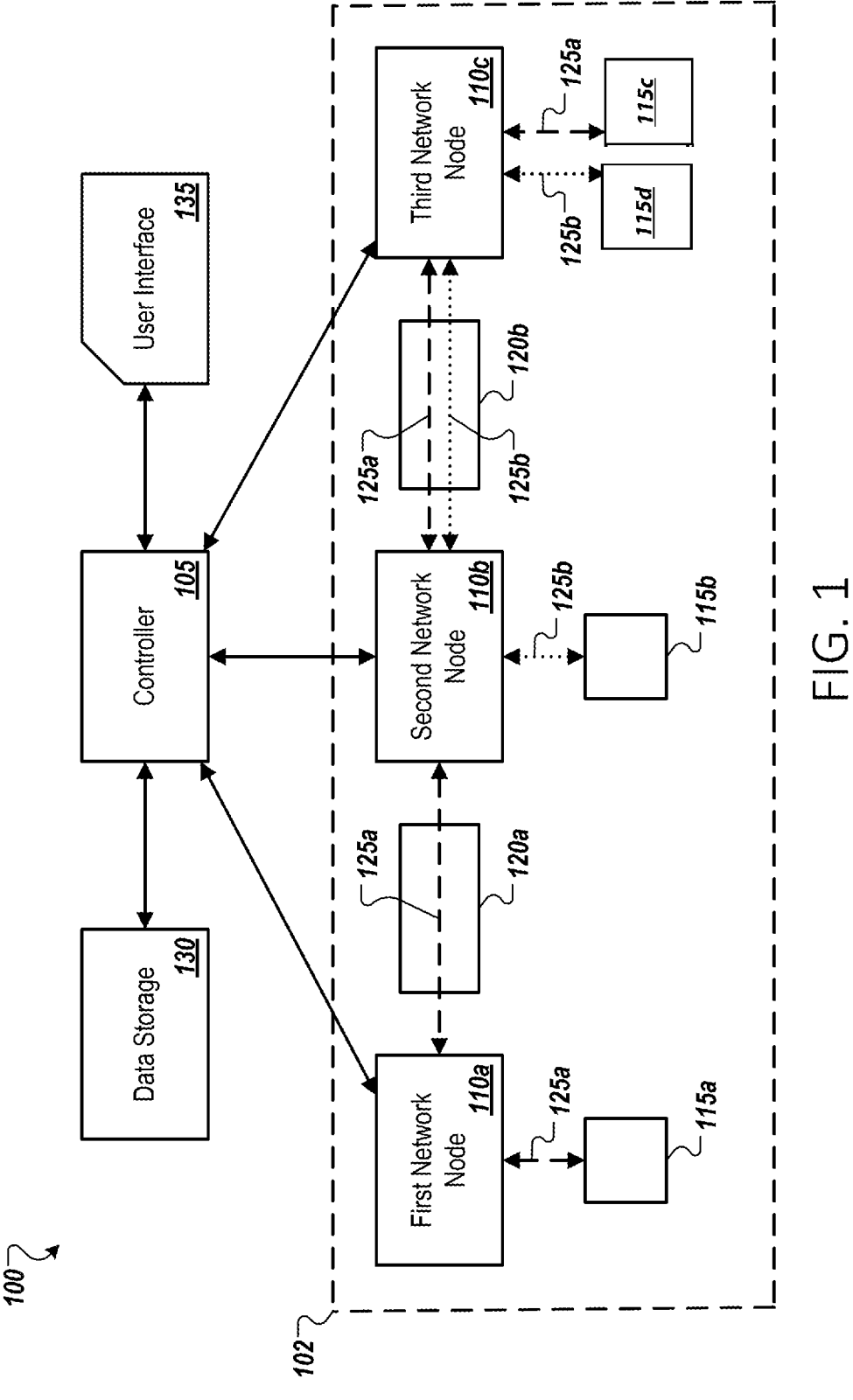
FIG. 1 is a block diagram of an example environment configured to support SMAOTTs for an optical network.

Wavelength Division Multiplexing (WDM) optical networks transport data over optical fiber using multiple wavelengths of light, where each wavelength may be a separate data service or channel. Typically, transponders or pluggable optical modules (hereafter referred to as "transponder") are used to create (at their starting point) and receive (at their end point) the wavelength services, which are transported from source to destination transponder over an optical line system (OLS). The optical layer health of these networks is monitored in real-time using optical Performance Monitors (PMs). PMs exceeding normal operational ranges are flagged to the customer as "at risk" using threshold crossing alerts (TCA). The alert trigger level is set using TCA thresholds. In traditional systems transponder PMs monitor the delivered quality (to the transponder) of the optical service but cannot identify the specific location or equipment at root cause of any optical degradations encountered. Similarly, the OLS monitors optical PMs for health at locations throughout the OLS network between transponders and can identify locations of optical degradations therein. OLS optical PM types monitored typically include optical loss, optical power, optical return loss, optical signal to noise ratio (OSNR) and others. However, these OLS optical PMs cannot accurately indicate the risk of service bit errors unless the risk is significant, such as optical power loss of service (LoS). This is because the TCA thresholds are set with no knowledge of the optical service margins available and so are set by design. Optical service margin is the additional optical degradation allowed to a service before bit errors would occur. For example, OLS optical PMs may degrade to the point of causing bit errors but with no OLS optical TCA raised (false negative). Similarly, OLS optical PMs may degrade and cause a TCA to be raised when the risk of service bit errors is still very low. Typically, OLS optical PM TCA thresholds are set to reflect the most drastic operation conditions supported by the system and so are prone to false negatives. Determining a cause of the data errors (which may include determining a location associated with the data errors to the optical service) may be difficult and/or time consuming. For example, a causal analysis of data error to an optical service may include at least acquiring a log history of the optical network PMs (which may be time intensive and/or data intensive) and an expert review of the acquired log. This patent introduces novel OLS optical PM TCA thresholds that can solve this problem, Service Margin Aware OLS TCA Thresholds (SMAOTT). The SMAOTT value is set so that when satisfied, there is a known and appreciable risk of bit errors to one or more services.

In some aspects of the present disclosure, a controller may determine optical margins for optical services included in an optical network, using an optical reach model. The optical margin associated with the optical services may be calculated based on the optical degradations caused by the optical components in the optical network as reflected in the optical PM values. Example degradations include but are not limited to noise contributed by lasers and amplifiers, non-linear impairments introduced by the span fibers, passive component distortions, optical losses etc. In some embodiments of the present disclosure, the optical margin may be determined on a per optical service basis by a controller so that a controller may determine SMAOTTs unique for each service, and unique to each monitoring point, enabling improved monitoring, network operation, control and trouble-shooting abilities associated with a network.

In some embodiments of the present disclosure, the SMAOTT(s) may be transmitted from a controller to OLS network nodes (which may include one or more network elements) such that the network elements may apply the SMAOTT(s) to the TCA(s) associated with optical PMs monitoring for optical degradations within the OLS optical network.

In some embodiments of the present disclosure, when an OLS network element (NE) PM satisfied a corresponding SMAOTT, the equipment may raise a TCA and notify a controller resulting in an alert responsive procedure which may include, but not be limited to automatic operations such as obtaining telemetry data from the network nodes associated with the optical services and/or alerted PM, automatically logging the telemetry data in the data storage, automatically identifying a cause of the alert which may include a location associated with the alert, and/or other responsive actions as described herein.

In some embodiments of the present disclosure, the network element may predict future values for PMs using machine learning methods, statistical extrapolation, or other time series prediction methods. The network element may then use this prediction in place of the current PM when comparing to the SMAOTT to determine if the TCA is raised. In this manner, the alert is "pre-emptive" with the benefit of providing more time for an alert responsive procedure.

The controller according to example embodiments determine SMAOTTs and provides these to the network element. Some SMAOTTSs are applied by the network element to a service independent PM (e.g. span loss), and some are applied by the network element to a service dependent PM (e.g. service OSNR observed at an equipment optical port).

When the PM is service independent, the PM's SMAOTT is still service dependent since each signal has a different optical margin, and the controller may transmit only a most sensitive SMAOTT to the network node to use with the PM. The most sensitive SMAOTT is the threshold with the least reach margin amongst all the services, and so represents the service most at risk against that PM. When the SMAOTT is satisfied (e.g., crossed), the TCA is raised to the controller by the node, and the node transmits the value of the PM that satisfied the current PM value. When the PM is service independent, the controller then receives the current PM value, identifies all services whose SMAOTT is satisfied by the received PM, and reports the identified services as services that are at risk. The controller may also start an action such as PM telemetry.

When the PM is service dependent for the monitoring point (e.g., nodal Optical Signal-to-Noise Ratio per Service (OSNR/srv)), the controller may transmit a SMAOTT for each service represented in that PM set. When the SMAOTT for any service in that PM set is crossed, the TCA is raised to the controller by the node, and the node transmits the current value of the PM along with the identifier of the impacted service to the controller. When the PM is service dependent, the controller receives the TCA for the service, identifies the service at risk and may start appropriate actions such as PM telemetry.

As noted above, the controller may determine individual optical services that may be at risk and may provide notifications to a user of the at-risk optical services, while not providing a notification to a user of non-at-risk optical services. As such, the controller according to example embodiments may avoid creating unnecessary alerts. In some embodiments, the network nodes may automatically transmit additional alert data to the controller, which may be used to determine a cause associated with the alert, and which may include at least a time and/or a location of the alert.

In some embodiments, in response to a TCA a controller may cause a scan, e.g., an Optical time-domain reflectometer scan (OTDR) of the optical network to be performed at the location of the TCA which may further contribute to determining the cause of the alert.

In some embodiments, in response to a TCA, a controller may automatically direct a reconfiguration of a route of the at-risk service(s) away from the location of the PM to another route with sufficient optical margin. In the present disclosure, automatically may refer to an operation being decided and/or performed without any user input. Alternatively, or additionally, automatically may refer to an operation being decided without user input and performed once user input confirms the operation using a user interface.

In some embodiments, aspects of the present disclosure may contribute to reduced downtime of an optical network, faster identification of a cause and/or a location of an alert in the OLS optical network, and/or a faster and automatic response to alerts within the OLS optical network, which may reduce downtime, reduce costs, and/or reduce time and effort in maintaining the optical network.

Embodiments of the present disclosure will be explained with reference to the accompanying drawings.

FIG. 1 is a block diagram of an example environment 100 configured to support optical PMs, TCAs and SMAOTTs and use thereof within an optical network 102, in accordance with at least one embodiment of the present disclosure. The environment 100 may include an optical network 102, a controller 105, and a data storage 130. The optical network 102 may include a first network node 110a, a second network node 110b, and a third network node 110c, referred to collectively as network nodes 110, a first transponder 115a, a second transponder 115b, a third transponder 115c, and a fourth transponder 115d, referred to collectively as transponders 115, and a first span 120a and a second span 120b, referred to collectively as spans 120.

In some embodiments, the controller 105 may be configured to determine an optical margin for each optical service. As used herein, an optical service is a service provided by a specific transponder laser source (one wavelength), and not a multiplexed group of wavelengths. An optical service margin represents the remaining optical degradation possible to a service before bit errors occur within the service. The optical margin is an end to end characteristic (e.g., from a source transponder to a destination transponder) and thus, generally involves the traversal of a number of spans and network nodes.

For example, a controller 105 may be configured to determine the optical margin for a first optical service 125a and/or a second optical service 125b, referred to collectively as optical services 125, traversing the optical network 102 between a transmitting network node and a receiving network node. As illustrated, the first optical service 125a may be transmitted between the first transponder 115a and the third transponder 115c and the controller 105 may obtain a first optical margin associated with the first optical service 125a. In another example, the second optical service 125b may be transmitted between the second transponder 115b and the fourth transponder 115d and the controller 105 may obtain a second optical margin associated with the second optical service 125b.

For example, the controller 105 may determine the optical margin based on the network nodes 110 included in the optical network 102 that may be used with a corresponding optical service. For example, the first optical margin associated with the first optical service 125a may be obtained by determining an amount of service degradation that may occur relative to the first optical service 125a during transmission of the first optical service 125a through network elements of the optical network 102. The amount of service degradation obtained relative to the first optical service 125a may include service degradation caused by the first network node 110a, the second network node 110b, the third network node 110c, the first transponder 115a, the third transponder 115c, the first span 120a, and/or the second span 120b and non-linear interference with second service 125b. Similarly, the second optical margin associated with the second optical service 125b may be obtained by the controller 105 by determining an amount of service degradation that may occur relative to the second optical service 125b during transmission of the second optical service 125b through the optical network 102. As previously noted, the service degradation is monitored or determined by tracking the PMs.

In some embodiments, the controller 105 may determine the optical margin associated with the first optical service 125a. The controller may then determine how much degradation may independently occur on an optical PM to cause the onset of bit errors for service 125a, and then set that value as the SMAOTT for that PM. The controller 105 may transmit the SMAOTT to the corresponding network node 110 monitoring that PM. For example, in instances in which the first optical service 125a is transmitted from the first transponder 115a to the third transponder 115c, a SMAOTT associated with the first optical service 125a for a PM monitored at node 110b may be determined using the controller 105, and the SMAOTT may be transmitted from the controller 105 to network node 110b. Alternatively, or additionally, in instances in which the second optical service 125b is transmitted from the second transponder 115b to the fourth transponder 115d, a SMAOTT associated with the second optical service 125b for a PM monitored at node 110c may be determined using the controller 105, and transmitted from the controller 105 to the third network node 110c.

The controller 105 according to example embodiments is a controller with modelling capability, which is coupled to a data storage 130. Specifically, the controller 105 includes a model corresponding to the optical network 100. As such, the model may be used to update, test and/or control aspects of the optical network 100. The controller 105 is connected to the data storage 130 that may store planning data associated with the optical network 100. The planning data serves as initial data for modelling the network until additional data such as in-field data from the optical network is received and/or stored. As in-field data is received the default planning data is updated with the in-field data to update the model and provide higher accuracy estimations relating to the optical network. The data storage 130 may also receive and store PM telemetry data received from the network nodes 110.

As previously noted, features of the optical margin and SMAOTTs may be leveraged in combination with PMs to provide improved network operation, monitoring and control. The optical margin associated with the optical services 125 in the optical network 102 may be calculated based on service degradations caused by the components in the optical network 102.

In some embodiments, the same PM type may be monitored at multiple locations in the optical network 102. The controller 105 will determine a unique SMAOTT for each PM at each unique monitoring location. The SMAOTT will be determined in isolation of all other SMAOTTs. As one example, the span loss PM may be monitored independently at span 120a and again at span 120b. The SMAOTT for the span loss PM for span 120a may be set to be a value corresponding to an amount of loss degradation associated with the span 120a that may result in the most sensitive of the optical services 125 traversing span 125a having optical margin too low, resulting in the risk of data errors and/or loss of service. Similarly, the SMAOTT for the span loss PM for span 120b may be set to be a value corresponding to an amount of loss degradation associated with the span 120b that may result in the most sensitive of the optical services 125 traversing span 125b having optical margin too low, resulting in the risk of data errors and/or loss of service.

The network nodes 110 may monitor PMs of the optical services 125 that may pass therethrough and may provide updates to the controller 105 regarding the optical services 125. For example, the network nodes 110 may monitor one or more PMs associated with the optical services 125 and may compare the PMs to the associated SMAOTTs obtained from the controller 105. In instances in which the PMs satisfy the SMAOTT, the network nodes 110 may generate the associated TCA and transmit the TCA to the controller 105. Alternatively, or additionally, any of the network nodes included in and/or associated with the nodes 110 may generate a TCA associated with a PM satisfying a corresponding SMAOTT. Alternatively, the network nodes 110 included in the optical network 102 may report regular PM updates to a computing system or network application (not illustrated) which also received the associated SMAOTTs from controller 105 and the computing system may determine instances in which the SMAOTT is satisfied and may generate the TCA and/or may initiate the alert responsive procedure.

In some embodiments, a time stamp may be applied to the TCA by the network nodes 110. The time stamp may be used to determine changes relative to time and/or a more precise determination as to when the TCA was initiated and/or resolved relative to non-time stamped TCA. Alternatively, the controller 105 may be configured to time stamp the TCA based on a received time of the TCA by the controller 105.

The TCA transmitted by the network nodes 110 may be accompanied by telemetry data of PMs associated with the TCA, an identifier for the node 110 raising the alert, an identifier for an optical port within the node associated with the PM and other information helping identify the location and/or root cause of the alert.

In these or other embodiments, the telemetry data may include an identifier associated with an optical service when the PM is service dependent (e.g., a service identification number of the optical service), such that the optical service that satisfied the SMAOTT (e.g., to initiate the TCA) may be differentiated from other optical services that may be included in the network nodes 110. Further, in some embodiments, after the TCA is asserted, the telemetry data may be transmitted periodically from the network nodes 110 to the controller 105. For example, the network nodes 110 may be configured to transmit updated telemetry data to the controller 105 every thirty seconds. Additionally, in response to a TCA, the network nodes 110 may perform an in-service synchronization updating the controller 105 with current PMs, and the controller 105 may use these to update its model, update SMAOTTs and provide update SMAOTTs back to the network elements.

For example, an in-service synchronization may include individually updating the model using the most recent optical PMs reported by optical nodes and then recalculating the optical margin estimations for the optical services 125 that may be transmitted within the optical network 102. The in-service synchronization may be automatically performed by the controller 105 in response to an optical TCA being received by the controller 105, for example caused by a reduction in optical power or OSNR. An in-service synchronization may also be performed in response to a PM variation that does not satisfy a SMAOTT but instead satisfies a different threshold specifically set to trigger a synchronization. In-service synchronizations may also be performed when a change to the optical network 102 is detected which may include new installations and/or repair of the optical network 102. The synchronization threshold associated with an in-service synchronization may be determined by a user of the optical network 102, such as an operator of the user interface 135. For example, in instances in which the synchronization threshold is satisfied, the in-service synchronization may be performed, and the optical margin associated with the optical services 125 in the optical network 102 may be determined.

In some embodiments, an in-service synchronization will lead to recalculating of all SMAOTTs by controller 105 and retransmission of said values to the network, to be applied as new alert thresholds for the TCAs.

In some embodiments, the optical margin estimation of the optical services 125 may be described by a service quality metric that may be similar to delivered quality factor (Delivered Q, dBQ) delivered to the receiving transponders and associated with the optical services 125.

In some embodiments, the user interface 135 may be configured to receive user input and transmit the user input to the controller 105. The user input obtained via the user interface 135 may include a user-defined minimum allowed margin for the service quality metric (for example, delivered quality factor (dBQ)) and/or a user defined margin on top of the SMAOTT defined by the controller 105. For example, the SMAOTT may be adjusted to be larger or smaller by the value of the user-defined margin input with the user interface 135.

In some embodiments, data in the data storage 130 may be obtained by a remote system and the data may be used for analytics associated with the optical network 102 in the environment 100 (e.g., including the network nodes 110, the transponders 115, the spans 120, the first optical service 125a, and/or the second optical service 125b). For example, a remote system may obtain data in the data storage 130 and may generate a graph corresponding to the margin before SMAOTT over time in a particular PM associated with the first optical service 125a. In another example, a colour-coded heat map may be generated highlighting current margins for all SMAOTTs using a topology diagram. In these or other embodiments, the heat map may be displayed by the controller 105 and/or the user interface 135 to provide a visual indication of the status of the components of the optical network 102.

Figure 2:
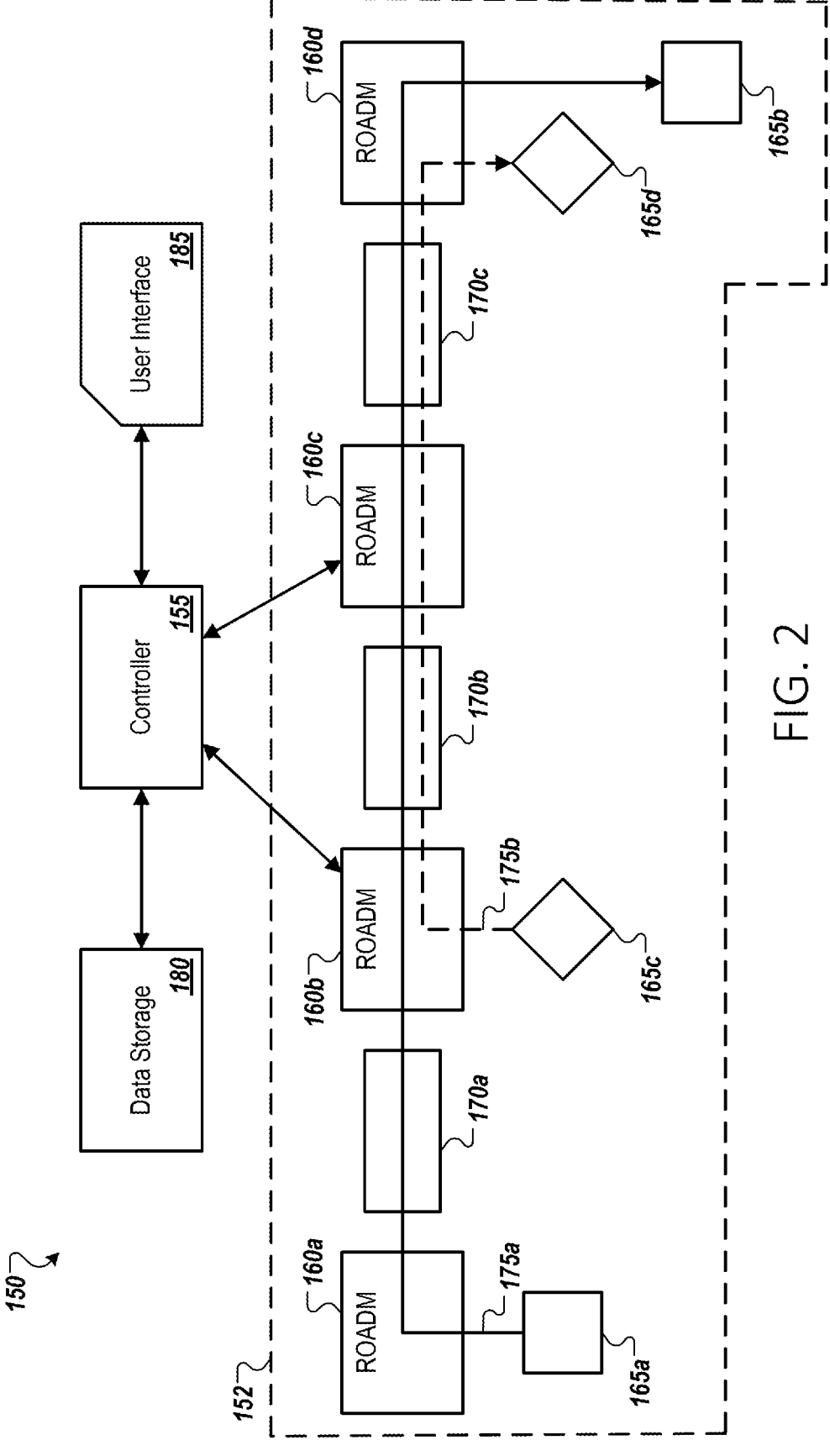
FIG. 2 is a block diagram of an example environment configured to support SMAOTTs for an optical network in which network nodes are identified as Reconfigurable Optical Add-Drop Multiplexers (ROADMs)
Figure 3:
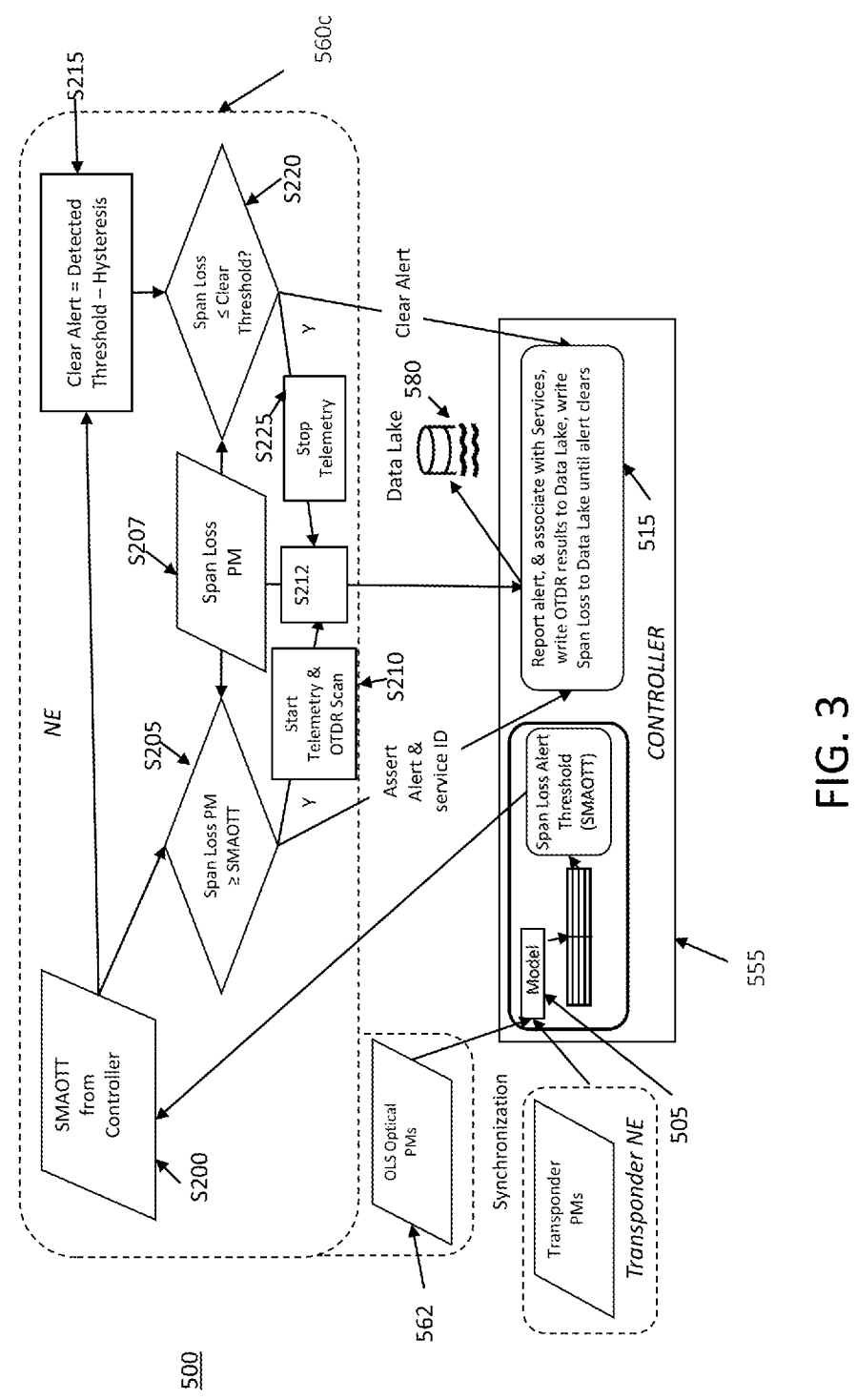
FIG. 3 is a block diagram of an example environment configured to support SMAOTTs for an optical network, which includes example control messaging signal flows and operations of a network element and network controller.

A working example of embodiments noted above and associated processes is described herein relative to FIGS. 2, 3 and 4. FIG. 2 is a block diagram of an example environment 150 configured to support SMAOTTs within an optical network 152. The environment 150 includes an optical network 152, a controller 155, and a data storage 180. The optical network 152 includes a first ROADM 160a, a second ROADM 160b, a third ROADM 160c, and a fourth ROADM 160d, referred to collectively as ROADMs 160, a first transponder 165a, a second transponder 165b, a third transponder 165c, and a fourth transponder 165d, referred to collectively as transponders 165, and a first span 170a, a second span 170b, and a third span 170c, referred to collectively as spans 170. In some embodiments, the transponders 165 may be configured to transmit and/or receive a first service 175a, and a second service 175b, referred to collectively as services 175, where the services 175 may be traversing the optical network 152 via the ROADMs 160 and the spans 170.

In some embodiments, the controller 155 may include an optical network plan or model associated with the optical network 152. The model includes an arrangement of simulated network nodes, simulated transponders, simulated spans, and/or simulated optical services. In some embodiments, upon an implementation of the optical network plan (e.g., setting up the optical network 152 with real hardware according to the optical network plan), the controller 155 may perform a synchronization (e.g., an in-service synchronization) to update the planning data of the model for the optical network 152 and the optical margin associated with the services 175 by reading PM data from nodes 160 and substituting these for the planning data. The controller 155 may obtain an estimated optical margin for the optical network 152, that may be described by a service quality metric that may be similar to optical delivered quality factor (dBQ) associated with the optical services 165. The controller may use this model to calculate one or more SMAOTTs, worst case optical PM TCA threshold values that may occur before the services 175 experience a data error during the transmission thereof through the optical network 152 (e.g., an amount of bit errors that may result in a degradation, damage, or other interruption of the associated services 175). For example, the controller 155 may determine a SMAOTT for the amount of degradation that may occur for each span loss of the spans 170, before the services 175 may be interrupted, and the controller 155 may store the SMAOTT values in the data storage 180.

A minimum acceptable limit may apply to the service quality metric used in the model before optical services 175 are subject to unacceptable quality, such as bit errors. In some embodiments, the minimum acceptable service quality metric may vary based on the data rate or other characteristics of the optical service. For example, in instances in which the first optical service 175a has a bit rate of 400 Gbps and traverses the optical network 152 via the first span 170a, the second span 170b and the third span 170c and a second optical service 175b has a bit rate of 800 Gbps and traverses the optical network 152 via the second span 170b and the third span 170c, the first optical service 175a may have a different minimum acceptable service quality metric than the second optical service 175b. In another example, in instances in which the first optical service 175a has a bit rate of 800 Gbps and traverses the optical network 152 via the first span 170a, the second span 170b and the third span 170c, and the second optical service 175b has a bit rate of 800 Gbps and traverses the optical network 152 via the second span 170b and the third optical span 170c, the first optical service 175a may have a different minimum acceptable service quality metric than the second optical service 175b if the services use different encoding or modulation schemes.

An example embodiment where SMAOTTs are applied to the service independent PM span loss is shown in FIGS. 2, 3 and 4.

FIG. 3 illustrates an example embodiment of the network control, message and TCA flow for the service independent PM span loss. A network controller 555 includes a processor and storage and implements a model for the optical network 500. The model initially stores and provides estimates of delivered quality (delivered Q) values associated with the optical network 500 based on planning data associated with the optical network and components thereof. A brownfield synchronization may be performed to synchronize the model 505 with optical PMs of the optical network 500. A network element (NE) 560c represents the plurality of NEs included in the optical network. The network element may be a ROADM, such as ROADMs 160 shown in FIG. 2 or may be in line amplifier (ILA) or other OLS network elements not shown for simplification purposes. The NEs are connected via spans 170 in FIG. 2. Information regarding the spans including the span loss PMs 562 and SMAOTTs ("Span Loss Alert Threshold" S200 in FIG. 3) are communicated between the NEs (e.g. 560c) and the network controller 555.

For each span within the optical network 500, the controller 555 calculates a worst case allowed PM (e.g., span loss) before the delivered Quality factor (dBQ-margin) is at risk for each service travelling through the corresponding span and stores the information in a table. For example, values of a calculated worst case allowed PM are stored and maintained in a table. An example table is shown in FIG. 4 as explained below.

FIG. 4 illustrates an example of the SMAOTT table in which five different services are travelling through a span in optical network 152 of FIG. 2. Two services identified as A1 and A2 originate at the same node as transponder 165a and are received at the same node as transponder 165b in FIG. 2. The second sending and second receiving transponders are not shown for simplification purposes. Three services identified as N1, N2 and N3 originate at the same node as transponder 165c and are received at the same node as transponder 165d in FIG. 2. The second and third sending and receiving transponders are not shown for simplification purposes. The table 205 in FIG. 4 stores, for each service, the current modelled delivered Q (dBQ), the worst case allowed Delivered Q (dBQ) before bit errors, and the maximum span loss value 170c of FIG. 2 that would result in the minimum allowed Delivered Q (dBQ).

The network controller 555, based on the model 505, may provide the various NEs with span loss SMAOTTs. The SMAOTTs may be determined based on threshold tables as shown in FIG. 4. The respective NEs monitor PMs at respective locations with the network and may provide TCAs to the network controller 555 when appropriate, e.g., when the SMAOTT is crossed. For example, referring to FIG. 2, the ROADM 160c of the optical network 152 monitors PMs. The PMs monitored by the ROADM 160c may include the second span loss 170b, the third span loss 170c, etc.

As an example of a service independent PM, span loss is used as described with respect FIG. 3 and table 205 of FIG. 4. In this example, an initial span loss for the services A1, A2, N1, N2 and N3 passing through the span monitored by NE 560c is a span loss of 8 dB (not shown). The controller 555 may use the model 505 to determine the maximum allowed span loss PM before bit errors occur for each service. In the example of table 205 of FIG. 4, this is the right-most column. The controller 555 may then choose the most sensitive threshold in the column as the SMAOTT for that PM, which in the example of FIG. 4 is 10 dB. The controller 555 then provides a span loss alert threshold to the NE 560c of 10 dB.

The NE 560c receives or detects the span loss alert threshold from the network controller 555 (S200 of FIG. 3). The NE 560c monitors span loss at the NE 560c (S207 of FIG. 3). As the span loss alert threshold is set to 10 dB, the NE 560c will send a span loss TCA to the network controller 555, along with the current PM value, when the span loss detected at the NE 560c is greater than or equal to 10 dB (S205 of FIG. 3). In response to receiving the span loss TCA from the NE 560c indicating that the detected span loss is greater or equal to 10 dB, the network controller 555 may take action. In addition to providing the span loss TCA to the network controller 555, the NE 560c may also begin an OTDR scan of the span and start streaming telemetry data of the span loss PM to the network controller 555 in response to the span loss threshold being satisfied (S210 of FIG. 3). The NE 560c may also perform an OTDR scan and provide results to the network controller 555 (S212 of FIG. 3). The NE 560c may provide stored telemetry data to the network controller 555 (S212 of FIG. 3).

In addition to the span loss alert threshold, FIG. 3 also illustrates a second threshold used to clear the span loss alert (S215). The NE clears or stops transmitting the span loss alert when the span loss detected by the NE becomes less than or equal to a clear threshold (S220 of FIG. 3). When the span loss alert is cleared, telemetry of the PMs from the NE 560c to the network controller 555 is stopped (S225 of FIG. 3). Results of the telemetry and/or indication the telemetry is stopped may be provided to the network controller by the NE (S212 of FIG. 3).

An example action taken by the network controller 555 is described with respect to table 205. The example table 205 shows characteristics of the five different services. For example, the table identifies each service with a service type, a delivered Q at start, the minimum delivered Q allowed (based on service type), and the maximum span loss corresponding to the minimum delivered Q allowed. The span loss TCA received at the network controller 555 provides an inherent fault location since the alert relates to span loss detected at the location of the span monitored by NE 560c. The network controller 555 may cause action or further monitoring specific to the NE 560c that has issued the span loss TCA.

Alternatively or additionally, the network controller 555 may analyze and identify services that are at risk based on the span loss TCA. For example, table 205 indicates the span loss of 10 dB indicates that service N3 is "at risk". In view of table 205, the service N3 can be identified as "at risk", whereas other services handled by the NE 560c are not at risk when the span loss of 10 dB is detected. The network controller 555 writes a time stamped PM and/or time stamped streaming telemetry of the PM (e.g., span loss in this example) and the OTDR scan file to the data lake 580, associates the alert with all services having threshold "at risk" from the measured span loss, and logs these service IDs. In an example in which 13 dB is the measured span loss, services A2, N2 and N3 would be identified as "at risk" and logged. According to example embodiments, only "at risk" services may be logged to reduce required storage and/or more efficiently use available storage.

Figure 5:
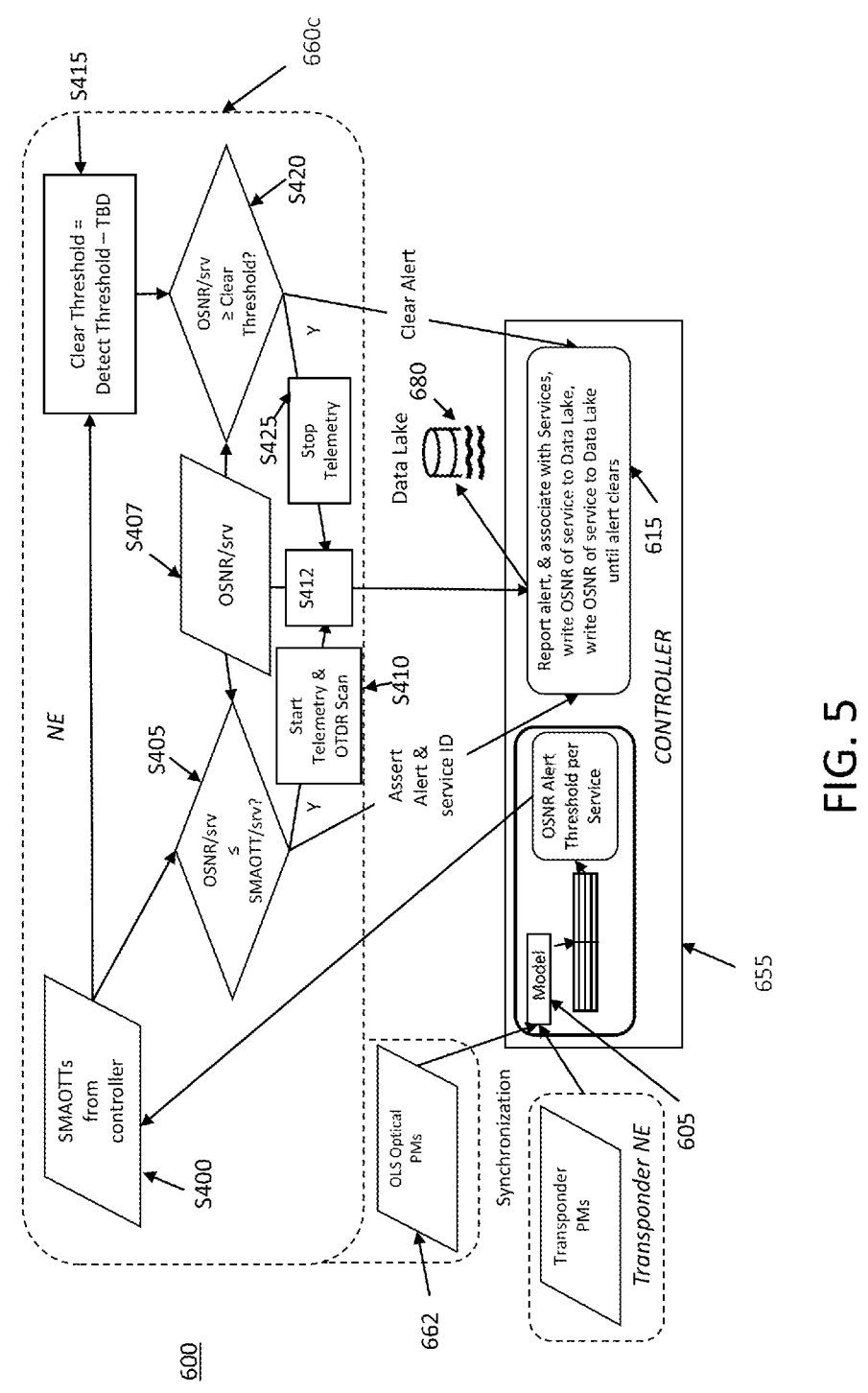
FIG. 5 is a block diagram of another example environment configured to support SMAOTTs for an optical network which includes example control messaging signal flows and operations of a network element and network controller.

Another example embodiment in which SMAOTTs are applied to a service dependent PM is shown in FIGS. 2, 5 and 6. As noted, the example below is service dependent, whereas the previous example is service independent. In the service dependent example below, the PM monitored and used is nodal Optical Signal-to-Noise Ratio per Service (OSNR/srv).

FIG. 5 illustrates an example embodiment of the network control, message and TCA flow for the service independent PM OSNR/srv. A network controller 655 that includes a processor and storage and implements a model for the optical network 600. The model initially stores and provides estimates of delivered quality (Delivered Q) values associated with the optical network 600 based on planning data associated with the optical network and components thereof. A brownfield synchronization may be performed to synchronize the model 605 with optical PMs of the optical network 600. A network element (NE) 660c represents the plurality of NEs included in the optical network. The network element may be a ROADM, such as ROADMs 160 shown in FIG. 2 or may be an in line amplifier (ILA) or other OLS network elements not shown for simplification purposes. The NEs are connected via spans 170 in FIG. Information regarding the PMs including the OSNR/srv PMs 662 and SMAOTTs (OSNR alert thresholds per service S400 in FIG. 5) are communicated between the NEs (e.g. 660c) and the network controller 655.

For each service within the optical network 600, and at each location monitored for OSNR/srv, the controller 655 calculates a worst case allowed PM (e.g., OSNR/srv) before the delivered Quality factor (dBQ-margin) is at risk for each service travelling through the monitoring location and stores the information in a table. For example, values of a calculated worst case allowed PM are stored and maintained in a table (e.g., OSNR per service threshold). An example table is shown in FIG. 6 as explained below.

FIG. 6 illustrates an example of the SMAOTT table in which five different services are travelling through an OSNR monitoring location in optical network 152 of FIG. 2. Two services identified as A1 and A2 originate at the same node as transponder 165a and are received at the same node as transponder 165b in FIG. 2. The second sending and receiving transponders are not shown for simplifications purposes. Three services identified as N1, N2 and N3 originate at the same node as transponder 165c and are received at the same node as transponder 165d in FIG. 2. The second and third sending and receiving transponders are not shown for simplifications purposes. The table 705 in FIG. 6 stores, for each service, the current modelled Delivered Q (dBQ), the worst case allowed Delivered Q (dBQ) before bit errors and the minimum allowed OSNR at the monitoring location that would result in the minimum allowed Delivered Q (dBQ).

The network controller 655 based on the model may provide the various NEs with OSNR SMAOTTs per service. In this example, each service may have a different OSNR TCA threshold, i.e. a different SMAOTT. The SMAOTTs may be stored in a threshold table as shown in FIG. 6. The respective NEs monitor PMs at respective locations with the network and may provide TCAs to the network controller 655 when appropriate, when a SMAOTT is crossed. For example, referring to FIG. 2, the ROADM 160c of the optical network 152 monitors PMs. The PMs monitored by the ROADM 160c may include the OSNR/srv of the optical services where transmitted onto span 170c.

As an example of a service dependent PM, OSNR/srv is used as described with respect FIG. 5 and table 705 of FIG. 6. Table 705 illustrates an OSNR/srv TCA threshold for the services A1, A2, N1, N2 and N3 monitored by NE 660c. The OSNR/srv TCA threshold for each service in this example is listed in the column "SMAOTT: Minimum OSNR allowed at monitoring location@Min Delivered Q Allowed" of table 705. For example, the span OSNR/srv TCA threshold for service N3 is 25 dB, and the span OSNR/srv threshold for service A1 is 15 dB according to table 705 of FIG. 6. Based on the model, the controller 655 provides the span OSNR/srv TCA threshold for each service to the NE 660c.

The NE 660c receives or detects the OSNR/srv alert thresholds from the network controller 655 (S400 of FIG. 5). The NE 660c monitors the PM OSNR/srv at the NE 660c (S407 of FIG. 5). As the monitored OSNR/srv at the NE 660c for the service N3 degrades to 25 dB, the NE 660c will send an OSNR TCA for the service N3 to the network controller 655 (S405 of FIG. 5), along with the current PM value. As the TCAs in this example are service dependent, the NE 660c will provide service ID along with the TCA. In response to receiving the OSNR TCA and corresponding service ID from the NE 660c indicating that a service is "at risk", the network controller 655 may take action. In addition to providing the OSNR TCA and corresponding service ID to the network controller 655, the NE 660c may also begin providing OSNR PM telemetry data to the network controller 555 (S410 of FIG. 5). The NE 660c may also perform an OTDR scan and provide results to the network controller 655 (S412 of FIG. 5). The NE 660c may provide stored telemetry data to the network controller 655 (S412 of FIG. 5)

In addition to the OSNR/srv alert threshold, FIG. 5 also illustrates a second threshold used to clear an OSNR alert (S415). The NE clears or stops transmitting the OSNR/srv alert when the OSNR/srv threshold detected by the NE becomes greater than or equal to a clear threshold (S420 of FIG. 5). When the OSNR/srv alert is cleared, telemetry of the PMs from the NE 660c to the network controller 655 is stopped (S425 of FIG. 5).

An example action taken by the network controller 655 is described with respect to table 705. The example table 705 shows characteristics of the five different services. For example, the table identifies each service with a service type, a delivered Q at start, the minimum delivered Q allowed (based on service type), and the minimum OSNR/srv at the monitoring location being considered corresponding to the minimum delivered Q allowed. The OSNR/srv TCA received at the network controller 655 provides an inherent fault location since the alert relates to OSNR/srv detected at the location of the NE 660c. The network controller 655 may cause action or further monitoring specific to the NE 660c that has issued the OSNR/srv TCA for the service.

Alternatively or additionally, the network controller 655 analyzes and identifies services that are "at risk" based on the TCA and corresponding service ID. For example, table 705 indicates the service N3 will be identified as "at risk" when it's OSNR/srv reaches 25 dB, whereas other services handled by the NE 660c may not be at risk. When the network controller 655 receives the OSNR/srv TCA, it logs the service ID and PM value to the data lake 680 and may conduct an OTDR scan. In an example in which 23 dB is measured for service N2, it would be identified as "at risk" and logged. According to example embodiments, only "at risk" services may be logged to reduce required storage and/or more efficiently use available storage.

Figure 7:
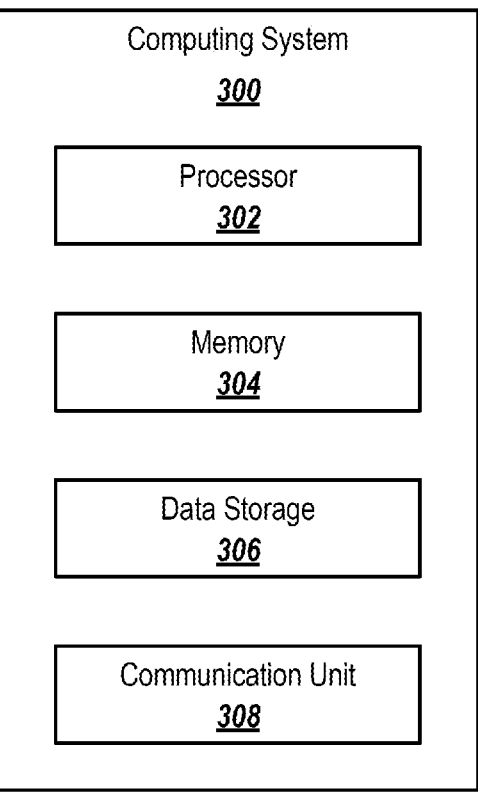
FIG. 7 illustrates an example computing system that may be used for a margin alert for an optical network.

FIG. 7 illustrates an example computing system 300 that may be used for a margin alert for an optical network, in accordance with at least one embodiment of the present disclosure. The computing system 300 may be configured to implement or direct a margin alert for an optical network, which may include operation of one or more components included in the environment 100 of FIG. 1, such as the controller 105, the network node 110, the transponders 115, and/or performance of the method 200 of FIG. 2. The computing system 300 may include a processor 302, memory 304, data storage 306, and a communication unit 308, which all may be communicatively coupled. In some embodiments, the computing system 300 may be part of any of the systems or devices described in this disclosure.

The processor 302 may include any computing entity, or processing device including various computer hardware or software modules and may be configured to execute instructions stored on any applicable computer-readable storage media. For example, the processor 302 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 302 may include any number of processors distributed across any number of networks or physical locations that are configured to perform individually or collectively any number of operations described herein.

In some embodiments, the processor 302 may be configured to interpret and/or execute program instructions and/or process data stored in the memory 304, the data storage 306, or the memory 304 and the data storage 306. In some embodiments, the processor 302 may fetch program instructions from the data storage 306 and load the program instructions in the memory 304. After the program instructions are loaded into memory 304, the processor 302 may execute the program instructions.

The memory 304 and the data storage 306 may include computer-readable storage media or one or more computer-readable storage mediums for carrying or having computer-executable instructions or data structures stored thereon. Such computer-readable storage media may be any available media that may be accessed by a computer, such as the processor 302.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 302 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 308 may include any component, device, system, or combination thereof that is configured to transmit or receive information over a network. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11ax, a WiMAX device, cellular communication facilities, etc.), and/or the like. The communication unit 308 may permit data to be exchanged with a network and/or any other devices or systems described in the present disclosure.

Modifications, additions, or omissions may be made to the computing system 300 without departing from the scope of the present disclosure. For example, in some embodiments, the computing system 300 may include any number of other components that may not be explicitly illustrated or described. Further, depending on certain implementations, the computing system 300 may not include one or more of the components illustrated and described.

Similarly, modifications, additions, or omissions may be made to the environment 100 without departing from the scope of the present disclosure. For example, the optical network 102 may include more or less nodes 110 than illustrated and/or more or less spans 120 than illustrated. In some embodiments, the first span 120*a* and/or the second span 120*b* may be representative of one or more spans and/or varying span lengths associated with the spans. As such, the optical network 102 may include any number of nodes 110 and/or any number of spans 120 (e.g., N nodes and/or M spans, where N may or may not be equal to M). Alternatively, or additionally, although illustrated as a linear topology, the optical network 102 may more or less nodes 110 and/or spans 120 to support other network topologies. For example, the optical network 102 may include a mesh network, a star network, a ring network, and/or a hybrid topology that may include a combination of any of the aforementioned networks. The network nodes 110 may include a reconfigurable optical add/drop multiplexer (ROADM) device that may perform the adding and/or dropping of optical services from an optical fiber of the optical network 102, as described herein. Alternatively, or additionally, the network nodes 110 may include one or more in-line amplifiers, that may be configured to amplify the optical services. Alternatively, or additionally, one or more in-line amplifiers may be dispersed throughout the spans 120 to amplify optical services traversing the spans 120. A length of the spans 120 may vary between a substantially shorter span (e.g., hundreds of meters, such as within a single campus) and a substantially longer span (e.g., a hundred kilometers or more). In some embodiments, the individual length of the spans 120 may vary between the spans 120. For example, the first span 120*a* may be a substantially longer span and the second span 120*b* may be a substantially shorter span.

In some embodiments, the controller 105 may include code and routines configured to allow one or more computing devices to perform one or more operations. Additionally, or alternatively, the controller 105 may be implemented using hardware including one or more processors, central processing units (CPUs), graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators), and/ or other processor types. In some other instances, the controller 105 may be implemented using a combination of hardware and software. In the present disclosure, operations described as being performed using the controller 105 may include operations that the controller 105 may direct a corresponding system to perform.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method leveraging service margin aware thresholds of optical alerts within an optical line system, the method comprising:

determining an optical margin for a service provided between a source transponder and a destination transponder through an Optical Line System (OLS), the OLS including a plurality of network elements, and plurality of optical fiber spans connecting the plurality of network elements;

monitoring performance monitors (PMs) and fixed predetermined thresholds to raise a threshold crossing alert (TCA) indicating a monitored performance monitor (PM) has crossed a predetermined fixed threshold;

determining a Service Margin Aware OLS TCA Threshold (SMAOTT) that is unique to a service or location within the OLS;

monitoring PMs and the determined SMOATT at a network element within the OLS;

raising a specific TCA associated with a SMAOTT when a monitored PM satisfies the SMAOTT; and triggering an alert responsive procedure to the specific TCA when the SMAOTT is satisfied to identify the service or location within the OLS associated with the SMAOTT.

2. The method according to claim 1, wherein the SMAOTT is different from the optical margin, the predetermined fixed TCA threshold and the TCA.

3. The method according to claim 1, wherein the determined SMOATT is unique to the service and a location, the location being a network element arranged between the source transponder and the destination transponder of the service that are connected via a plurality of spans of the OLS.

4. The method according to claim 3, wherein a plurality of SMOATTs are determined for the service and uniquely associated with network elements the service traversing between the source transponder and the destination transponder.

5. The method according to claim 1, wherein the monitored PMs include service independent PMs and service dependent PMs and the alert responsive procedure differs between the service independent PMs and service dependent PMs.

6. The method according to claim 1, wherein the PM is monitored at a network element between the source transponder and the destination transponder, when the monitored PM is a service independent PM, a SMAOTT is provided to the network element representative of a most sensitive service of a plurality of services being provided through the network element.

7. The method according to claim 1, wherein the alert responsive procedure includes at least one of obtaining telemetry data relating to the triggered specific TCA, logging the telemetry data, identifying the service associated with the specific TCA, identifying the location with the OLS associated with the specific TCA, direct a reconfiguration of route providing the service associated with the specific TCA.

8. A communication system comprising:

a memory; and at least one processor that leverages service margin aware thresholds of optical alerts within an optical line system, the at least one processor configured to:

determine an optical margin for a service provided between a source transponder and a destination transponder through an Optical Line System (OLS), the OLS including a plurality of network elements, and plurality of optical fiber spans connecting the plurality of network elements;

monitor performance monitors (PMs) and fixed predetermined thresholds to raise a threshold crossing alert (TCA) indicating a monitored performance monitor (PM) has crossed a predetermined fixed threshold;

determine a Service Margin Aware OLS TCA Threshold (SMAOTT) that is unique to a service or location within the OLS;

monitor PMs and the determined SMOATT at a network element within the OLS;

raise a specific TCA associated with a SMAOTT when a monitored PM satisfies the SMAOTT; and trigger an alert responsive procedure to the specific TCA when the SMAOTT is satisfied to identify the service or location within the OLS associated with the SMAOTT.

9. The communication system according to claim 8, wherein the SMAOTT is different from the optical margin, the predetermined fixed TCA threshold and the TCA.

10. The communication system according to claim 8, wherein the determined SMOATT is unique to the service and a location, the location being a network element arranged between the source transponder and the destination transponder of the service that are connected via a plurality of spans of the OLS.

11. The communication system according to claim 10, wherein a plurality of SMOATTs are determined for the service and uniquely associated with network elements the service traversing between the source transponder and the destination transponder.

12. The communication system according to claim 8, wherein the monitored PMs include service independent PMs and service dependent PMs and the alert responsive procedure differs between the service independent PMs and service dependent PMs.

13. The communication system according to claim 8, wherein the PM is monitored at a network element between the source transponder and the destination transponder, when the monitored PM is a service independent PM, a SMAOTT is provided to the network element representative of a most sensitive service of a plurality of services being provided through the network element.

14. A communication system comprising:

at least one network element; and a controller configured to leveraging service margin aware thresholds of optical alerts within an optical line system, the controller determines an optical margin for a service provided between a source transponder and a destination transponder through an Optical Line System (OLS) including the at least one network element;

determine a Service Margin Aware OLS TCA Threshold (SMAOTT) that is unique to a service or location within the OLS;

monitor PMs and the determined SMOATT at at least one network element within the OLS;

raise a specific TCA associated with a SMAOTT when a monitored PM satisfies the SMAOTT; and trigger an alert responsive procedure to the specific TCA when the SMAOTT is satisfied to identify the service or location within the OLS associated with the SMAOTT.

15. The communication system according to claim 14, wherein the determined SMOATT is unique to the service and a location, the location being a network element arranged between the source transponder and the destination transponder of the service that are connected via a plurality of spans of the OLS.

16. The communication system according to claim 15, wherein a plurality of SMOATTs are determined for the service and uniquely associated with network elements the service traversing between the source transponder and the destination transponder.

17. The communication system according to claim 14, wherein the monitored PMs include service independent PMs and service dependent PMs and the alert responsive procedure differs between the service independent PMs and service dependent PMs.

18. The communication system according to claim 14, wherein the PM is monitored at a network element between the source transponder and the destination transponder, when the monitored PM is a service independent PM, a SMAOTT is provided to the network element representative of a most sensitive service of a plurality of services being provided through the network element.

19. The communication system according to claim 14, wherein the alert responsive procedure includes at least one of obtaining telemetry data relating to the triggered specific TCA, logging the telemetry data, identifying the service associated with the specific TCA, identifying the location with the OLS associated with the specific TCA, direct a reconfiguration of route providing the service associated with the specific TCA.

\* \* \* \* \*